(12) United States Patent
Kaneko et al.

(10) Patent No.: US 9,588,366 B2
(45) Date of Patent: Mar. 7, 2017

(54) LIQUID CRYSTAL DISPLAY DEVICE COMPRISING A CAPACITANCE INSULATING FILM HAVING A THICKNESS AND A DIELECTRIC CONSTANT

(71) Applicant: Japan Display Inc., Tokyo (JP)

(72) Inventors: Toshiki Kaneko, Tokyo (JP); Takashi Nakamura, Tokyo (JP); Masahiro Tada, Tokyo (JP); Yukio Tanaka, Tokyo (JP); Hiroyuki Kimura, Tokyo (JP); Osamu Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 50 days.

(21) Appl. No.: 14/811,904

(22) Filed: Jul. 29, 2015

(65) Prior Publication Data

US 2016/0033829 A1 Feb. 4, 2016

(30) Foreign Application Priority Data

Jul. 29, 2014 (JP) .................................. 2014-153954

(51) Int. Cl.
*G02F 1/1362* (2006.01)
*G02F 1/1333* (2006.01)
*G02F 1/1343* (2006.01)

(52) U.S. Cl.
CPC ...... *G02F 1/133345* (2013.01); *G02F 1/1362* (2013.01); *G02F 1/134363* (2013.01); *G02F 2001/133397* (2013.01); *G02F 2202/42* (2013.01)

(58) Field of Classification Search
CPC ............. G02F 1/133345; G02F 1/1362; G02F 2202/42; G02F 2001/133397
See application file for complete search history.

(56) References Cited

U.S. PATENT DOCUMENTS

| 5,165,076 A | * | 11/1992 | Tsuboyama | .......... C09K 19/126 349/122 |
| 2004/0129949 A1 | * | 7/2004 | Deliwala | ................ B82Y 20/00 257/194 |
| 2008/0018816 A1 | | 1/2008 | Hattori et al. | |

FOREIGN PATENT DOCUMENTS

JP 2008-026430 A 2/2008

* cited by examiner

*Primary Examiner* — Paul Lee
(74) *Attorney, Agent, or Firm* — Typha IP LLC

(57) ABSTRACT

There is provided a high-definition liquid crystal display device that can prevent flicker due to a reduction in the pixel potential in a low-frequency drive of about 10 Hz to reduce power consumption. The pixel has a TFT formed of Poly-Si as a switching element. In the pixel, a capacitance insulating film is formed on a planar first electrode on which a comb-shaped second electrode is formed. When the film thickness of the insulating film is d and the dielectric constant at 10 Hz frequency is $\in$, it is given that $\in d \geq 5 \times 10^{-6}$ m at 10 Hz frequency. The capacitance insulating film does not have a hysteresis characteristic. The refractive index of the capacitance insulating film with respect to a light of a wavelength of 632.8 nm is 1.7 to 2.0.

12 Claims, 11 Drawing Sheets

US 9,588,366 B2

LIQUID CRYSTAL DISPLAY DEVICE COMPRISING A CAPACITANCE INSULATING FILM HAVING A THICKNESS AND A DIELECTRIC CONSTANT

CLAIM OF PRIORITY

The present application claims priority from Japanese Patent Application JP 2014-153954 filed on Jul. 29, 2014, the content of which is hereby incorporated by reference into this application.

BACKGROUND OF THE INVENTION (1) Field of the Invention

The present invention relates to a display device, and more particularly, to a liquid crystal display device capable of suppressing a flicker in a low frequency drive.

(2) Description of the Related Art

In a liquid crystal display device, pixels each having a pixel electrode, a thin film transistor (TFT) and the like are arranged in a matrix form in a TFT substrate. Further, a counter substrate is placed opposite the TFT substrate with a liquid crystal interposed between the TFT substrate and the counter substrate. Then, an image is formed by controlling the transmittance of light by liquid crystal molecules for each pixel.

The viewing angle characteristic is a problem for the liquid crystal display device. The viewing angle characteristic is a phenomenon of the change in the brightness or chromaticity between when the screen is viewed from the front, and when it is viewed in an oblique direction. The viewing angle characteristic is excellent in the In Plane Switching (IPS) mode for driving liquid crystal molecules by an electric field in the horizontal direction. There are several types of IPS modes. One of such IPS modes is the so-called Fringe Field Switching (FFS) in which, for example, a common electrode is formed in a matted manner on which a comb-shaped pixel electrode is formed with an insulating film between them, to rotate liquid crystal molecules by the electric field generated between the pixel electrode and the common electrode. The FFS mode can achieve a relatively high transmission and is now the mainstream.

A high definition screen is demanded for medium and small sized liquid crystal display devices, in which the area of each pixel is small. When the pixel area is reduced, the value of the additional capacitance may not be enough to stabilize the potential of the pixel electrode. Patent Document 1 (Japanese Patent Application Laid-Open No. 2008-26430) describes a configuration of an FFS type liquid crystal display device in which metal oxide particles with a high relative dielectric constant, such as $BaTiO_3$, are dispersed in an application-type transparent insulating film as an insulating film between a pixel electrode and a common electrode, in order to increase the capacitance while increasing the insulating property of the insulating film.

SUMMARY OF THE INVENTION

In liquid crystal display devices for mobile terminal applications such as smartphones, it is necessary to reduce the circuit power consumption. Low frequency drive and intermittent drive or the like have been proposed as one method of addressing this problem. The low frequency drive is a method of reducing the circuit power by reducing the drive frequency of the liquid crystal display device, for example, to half or one fourth with respect to the standard condition. Further, the intermittent drive is a method of reducing the circuit power by providing a circuit stop period of several display periods after the writing of one display period of the liquid crystal display device is performed.

Meanwhile, a higher screen definition is also required for such a display device, in which the screen may have a high pixel density of 440 pixels per inch (ppi) or more. In the high definition screen, the area of the pixel is reduced, and as a result, the capacitance of the pixel is not enough to stably hold the pixel electrode. The potential of the pixel electrode is switched in a short time in a high frequency drive. However, it is necessary to hold the potential of the pixel electrode for a long time in a low frequency drive or intermittent drive or other modes, so that a reduction in the potential of the pixel electrode occurs in the holding time. Such a change in the potential of the pixel electrode appears as a flicker, resulting in a degradation of the image quality.

The problem to be solved by the present invention is to suppress the change in the pixel electrode potential at a low frequency or intermittent drive in a high definition screen, to prevent the flicker from occurring.

The present invention has been made to overcome the above problem. Some of the major aspects are as follows.

(1) There is provided a liquid crystal display device including: a TFT substrate in which pixels are formed between scanning lines extending in a first direction and arranged in a second direction, and video signal lines extending in the second direction and arrange in the first direction; a counter substrate; and a liquid crystal interposed between the TFT substrate and a counter substrate. The pixels are formed at a density of 400 pixels per inch (ppi) or more in the first direction. The pixel has a TFT formed of poly-Si as a switching element. In the pixel, a capacitance insulating film is formed in a planar shape on a first electrode, and a comb-shaped second electrode is formed on the capacitance insulating film. When the film thickness of the capacitance insulating film is d and the dielectric constant at a frequency of 10 Hz is $\in$ in an operating environment of 50 degrees Celsius, it is given that $\in d \geq 5 \times 10^{-6}$ m at 10 Hz frequency. The capacitance insulating film does not have a hysteresis characteristic. The refractive index of the capacitance insulating film with respect to a light of a wavelength of 632.8 nm is in the range from 1.7 to 2.0.

(2) In the liquid crystal display device described in (1), the first electrode is a common electrode and the second electrode is a pixel electrode.

(3) In the liquid crystal display device described in (1), the cycle in which a video signal is written in the first electrode or in the second electrode is 10 Hz or less.

(4) In the liquid crystal display device described in (1), when the period of rewriting the video signal to the pixel is one frame, the frame is configured with a scanning period and a break period. The cycle of the frame is 10 Hz or less.

DETAILED DESCRIPTION OF THE PREFERRED EMBODIMENTS

The present invention will be described in detail below by means of preferred embodiments.

First Embodiment

Figure 1:
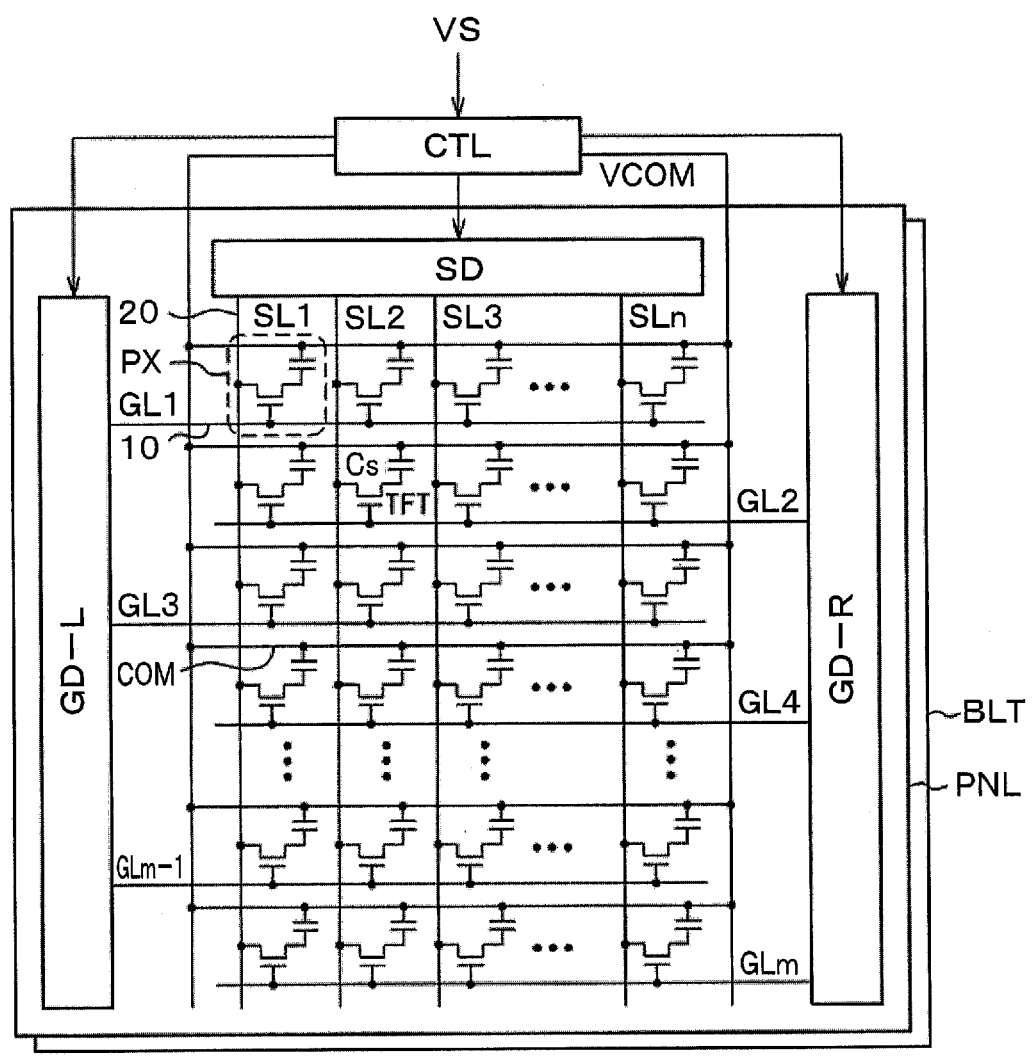
FIG. 1 is a schematic plan view of a liquid crystal display device.

FIG. 1 is a schematic plan view of a liquid crystal display device. As shown in FIG. 1, the liquid crystal display device includes a liquid crystal display panel PNL including a display unit with display pixels PX arranged in a matrix of m lines×n columns (where m and n are positive integers). The liquid crystal display device also includes a backlight BLT as an illuminating means for illuminating the liquid crystal display panel from the back side.

In FIG. 1, scanning lines 10 extending in the horizontal direction are arranged in the vertical direction and video signal lines 20 extending in the vertical direction are arranged in the horizontal direction. The scanning lines 10 are denoted by symbols GL1, GL2, and so on from upward to downward direction in the figure. Then, the video signal lines 20 are denoted by symbols SL1, SL2, and so on from the left side of the figure.

The pixel PX is formed in a region surrounded by the scanning lines 10 and the video signal lines 20. The pixel PX includes the TFT for switching between a pixel electrode and the video signal line 20, and a capacitance of the pixel CS between the pixel electrode and a common electrode COM. The pixel capacitance is configured with the capacitance formed by liquid crystal, as well as the storage capacitance formed by an insulating film between the pixel electrode and the common electrode. The pixel capacitance is dominated by the storage capacitance, so that the pixel electrode and the storage capacitance hereinafter may be used with the same meaning. A video signal SIG is written in each pixel by a source driver SD mounted in the liquid crystal display panel, through a control circuit CTL. A video signal VS is written in each pixel electrode for each line according to the selected scanning line 10.

Mobile products are battery driven, so that it is necessary to suppress power consumption. The power consumption can be suppressed by using a low frequency drive. However, when the low frequency drive is simply used, it is difficult to display a natural image for video display. This problem has been addressed by the use of a so-called intermittent drive designed to drive with a normal frequency for video display while reducing the frequency of writing to each pixel for still image display.

Figure 2:
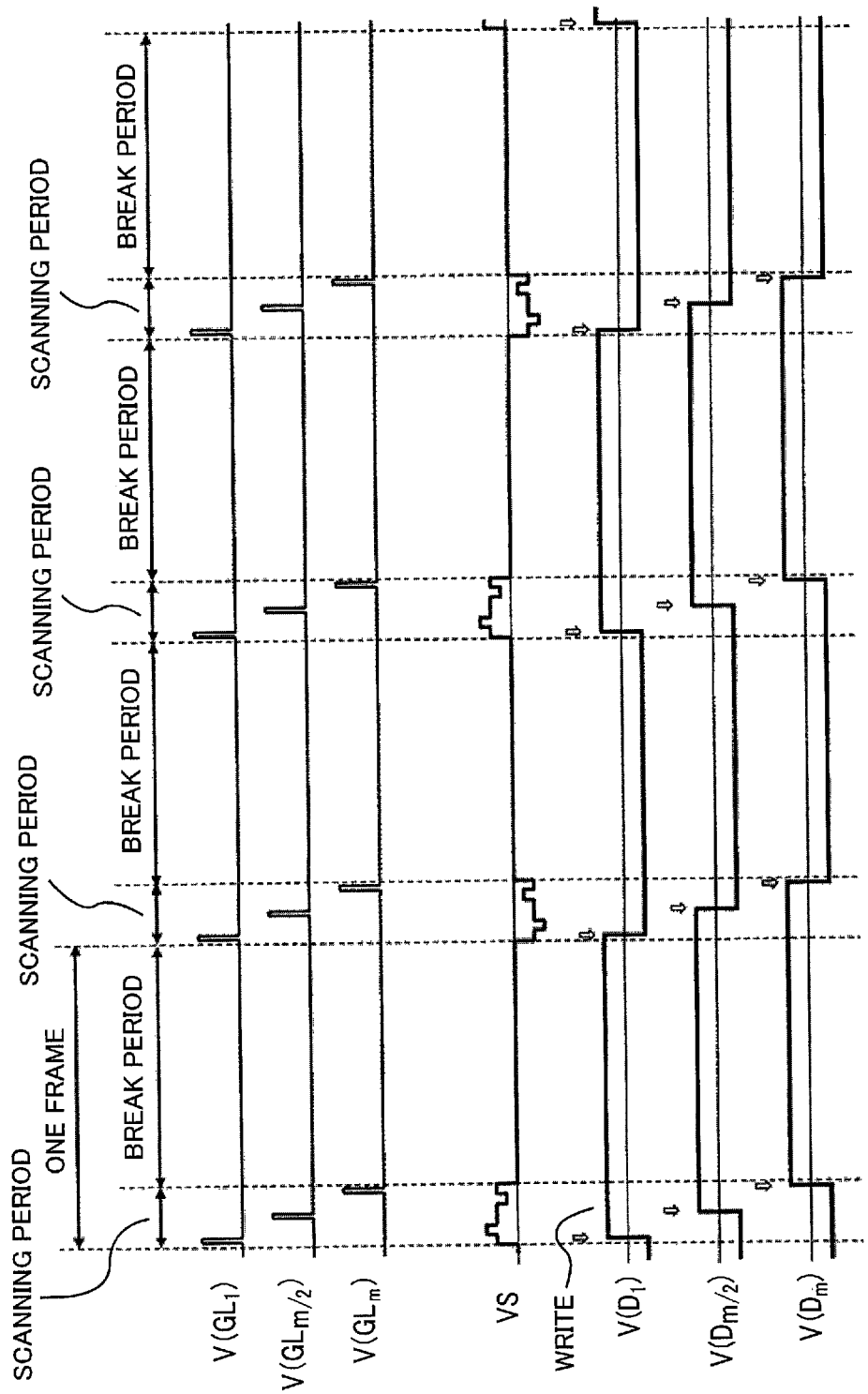
FIG. 2 is a timing chart showing intermittent drive.

FIG. 2 is a timing chart for such an intermittent drive. In the intermittent drive, one frame period is configured with a scanning period and a following break period. In the scanning period, the scanning lines GL1, GL2, and so on to GLm are selected in series, so that the TFTs, each of which is the pixel switch of the corresponding line, are sequentially brought into conduction. Then, the video signal VS output to the signal line 20 from the source driver is written and held in the pixel electrode of each line according to the timing at which the pixel switch of each line is electrically conductive. There are n video signal lines in the display area, but to simplify the description, it focuses on only one signal line, in which VS is the video signal corresponding to the particular signal line.

In the break period, any of the scanning lines GL is not selected, and the video signal held in each pixel electrode is continued to be held. Although the same operation is performed also in the next frame period, the polarity of the video signal is reversed for every frame, so that the video signal held by the pixel electrode is reversed for every frame. As a result, the potential applied to the pixel electrode has a rectangular waveform as shown in V (D1), V (D2) and so on to V (Dm).

Also in the intermittent drive, similar to the case of the low frequency drive, the pixel electrode is required to hold the same potential for a long time. However, the pixel capacitance is reduced as the area of the pixel becomes small, so that it is difficult to hold the potential. In order to hold the pixel potential, a reduction in the leakage current of the TFT can be effective. However, in the intermittent drive, the writing time should be reduced to support video display, so that it is difficult to use a-Si with small leakage current for the TFT. Thus, it is necessary to use poly-Si with a large mobility and with a large leakage current.

Figure 3:
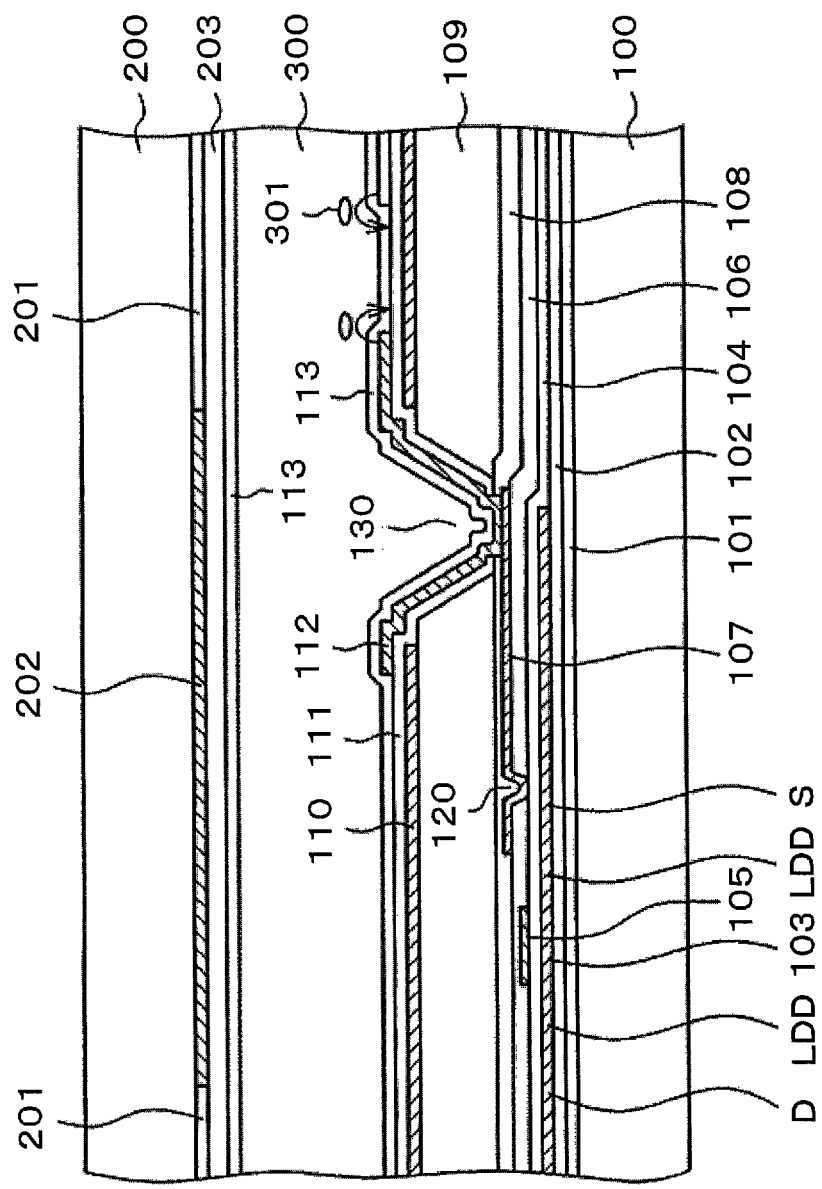
FIG. 3 is a cross-sectional view of a portion of a pixel of the liquid crystal display device.

FIG. 3 is a cross-sectional view of a pixel portion of the liquid crystal display panel. In FIG. 3, a first base film 101 of SiN as well as a second base film 102 of $SiO_2$ are formed by chemical vapor deposition (CVD) on a glass substrate 100. The role of the first base film 101 and the second base film 102 is to prevent a semiconductor layer 103 from being contaminated by impurities from the glass substrate 100.

The semiconductor layer 103 is formed on the second base film 102. The semiconductor layer 103 is formed in such a way that an a-Si film is formed by CVD on the second base film 102 and converted into poly-Si film by a laser anneal. Then, the poly-Si film is patterned by photolithography.

Figure 4:
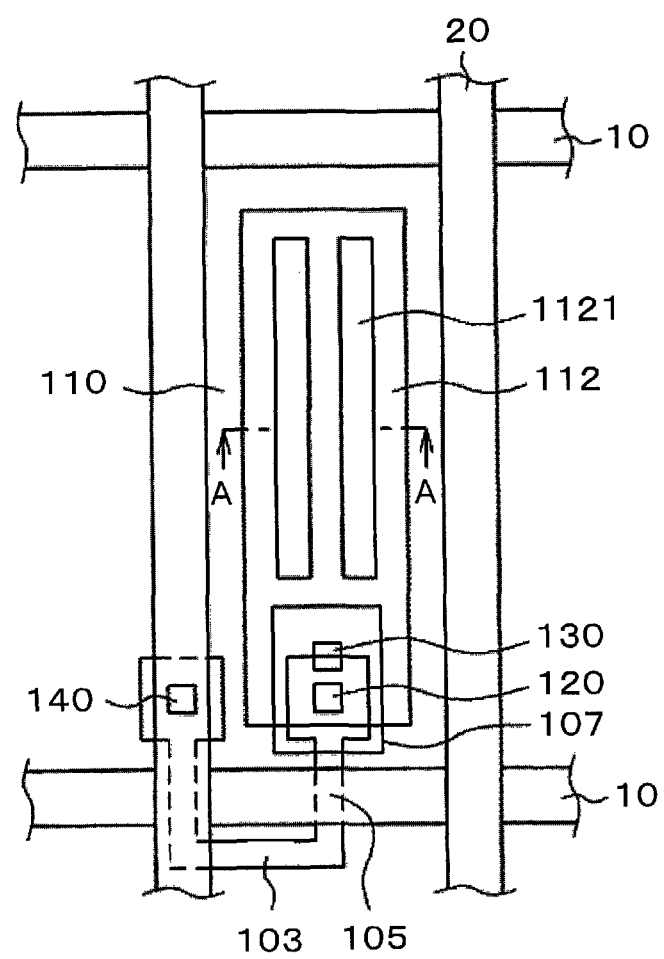
FIG. 4 is a plan view of a portion of a pixel of a TFT substrate.

A gate insulating film 104 is formed on the semiconductor film 103. The gate insulating film 104 is $SiO_2$ film prepared by tetraethoxysilane (TEOS). This film is also formed by CVD. A gate electrode 105 is formed on the gate insulating film 104. As shown in FIG. 4, the scanning line 10 also functions as the gate electrode 105. The gate electrode 105 is formed, for example, of MoW film. When there is a need to reduce the resistance of the gate electrode 105 or the scanning line 10, an Al alloy is used.

The gate electrode 105 is patterned by photolithography. In the patterning process, impurities such as phosphorus and boron are doped in the poly-Si layer to form a source S or a drain D in the poly-Si layer. Further, the photoresist for patterning of the gate electrode 105 is used to form a lightly doped drain (LDD) layer between a channel layer of the poly-Si layer and the source S or drain D.

After that, an interlayer insulating film 106 is formed of $SiO_2$ so as to cover the gate electrode 105. The role of the interlayer insulating film 106 is to isolate the gate wiring 105 and a contact electrode 107. A through hole 120 is formed in the interlayer insulating film 106 and the gate insulating film 104 so as to connect the source portion S of the semiconductor layer 103 to the contact electrode 107. Photolithography processes to form the through hole 120 in the interlayer insulating film 106 and in the gate insulating film 104 are performed at the same time.

The contact electrode 107 is formed on the interlayer insulating film 106. The contact electrode 107 is connected to the pixel electrode 112 through a through hole 130. The drain D of the TFT is connected to the video signal line 20 shown in FIG. 4 through a through hole 140.

The contact electrode 107 and the video signal line are formed in the same layer at the same time. The contact electrode 107 and the video signal line use, for example, an AlSi alloy to reduce the resistance. The AlSi alloy forms a hillock, and Al diffuses into other layers. For this reason, the AlSi alloy has a structure in which AlSi is sandwiched, for example, by a barrier layer of MoW, not shown, and a cap layer.

An inorganic passivation film (insulating film) 108 is formed so as to cover the contact electrode 107 to protect the whole TFT. Similarly to the first base film 101, the inorganic passivation film 108 is formed by CVD. Note that the inorganic passivation layer may be deleted if reliability remains high. An organic passivation film 109 is formed so as to cover the inorganic passivation film 108. The organic passivation film 109 is formed of photosensitive acrylic resin. The organic passivation film 109 may also be formed of other materials such as silicon resin, epoxy resin, and polyimide resin, in addition to acrylic resin. The organic passivation film 109 has a role of a flattering film and is made thick. The film thickness of the organic passivation film 109 is 1 to 4 μm and often about 2 μm.

The through hole 130 is formed in the inorganic passivation film 108 and the organic passivation film 109 in order to establish electrical conductivity between the pixel electrode 110 and the contact electrode 107. The organic passivation film 109 uses photosensitive resin. After application of the photosensitive resin, the resin is exposed. Then, only the illuminated portion is dissolved in a specific developer. In other words, by using the photosensitive resin, it is possible to omit the formation of the photoresist pattern. After the through hole 130 is formed in the organic passivation film 109, the organic passivation film is baked at about 230 degrees Celsius to complete the organic passivation film 109.

After that, an indium tin oxide (ITO) that serves as the common electrode 110 is formed by sputtering. Then, patterning is performed to remove the ITO from the through hole 130 and the periphery thereof. The common electrode 110 can be formed in a planar shape commonly to each of the pixels. Then, SiN is formed by CVD over the entire surface to form the common electrode 110. Then, in the through hole 130, a through hole is formed in the capacitance insulating film 111 and the inorganic passivation film 108 to establish electrical conductivity between the contact electrode 107 and the pixel electrode 112. If the inorganic passivation film is not present, the through hole is formed of a single layer of the capacitance insulating film.

After that, ITO is formed by sputtering and patterned to form the pixel electrode 112. FIG. 4 is a plan view of the pixel electrode 112. The pixel electrode 112 has a slit 1121. FIG. 4 will be described in detail below. An orientation film material is applied onto the pixel electrode 112 by flexographic printing, inkjet printing or the like. The alignment treatment of the alignment film 113 is performed by rubbing method or a photo alignment method using polarized ultraviolet light.

When a voltage is applied between the pixel electrode 112 and the common electrode 110, lines of electric force are generated as shown in FIG. 3. Liquid crystal molecules 301 are rotated by this electric field to control the amount of light passing through a liquid crystal layer 300 for each pixel to form an image. Further, a storage capacitance is formed between the pixel electrode 113 and the common electrode 110 with the capacitance insulating film 111 between them. The storage capacitance has the role of holding the potential of the pixel electrode. The purpose of the present invention is to stably hold the pixel potential by defining the storage capacitance in order to reduce the flicker in the low frequency drive or intermittent drive.

In FIG. 3, the counter substrate 200 is arranged opposite the TFT substrate 100 with the liquid crystal layer 300 between them. A color filter 201 is formed inside the counter substrate 200. The color filter 201 includes red, green, and blue color filters that are formed in each of the pixels, and in this way a color image is formed. A black matrix 202 is formed between the color filters 201 to improve the contrast of the image. Note that the black matrix 202 also has a role of a light shielding film of the TFT, preventing the light current from flowing into the TFT.

An overcoat film 203 is formed so as to cover the color filter 201 and the black matrix 202. The color filter 201 and the black matrix 202 have an uneven surface, so that the surface is smoothed by the overcoat film 203. The alignment film 113 is formed on the overcoat film to determine the initial alignment of the liquid crystal. The alignment treatment of the alignment film 113 is performed by rubbing method or a photo alignment method, similarly to the case of the alignment film 113 on the side of the TFT substrate 100.

FIG. 4 is a plan view of a pixel portion. In FIG. 4, the pixel electrode 112 is formed in a region surrounded by the scanning lines 10 and the video signal lines 20. The pixel electrode 112 in FIG. 4 has a rectangular profile with the slits 1121 therein. The region between the slits 1121 is the comb-shaped pixel electrode. When the width of the pixel is reduced, the width of the pixel electrode 112 is also reduced, and the pixel electrode 112 may even have only one tooth. In such a case, there is no slit in the pixel electrode.

The TFT is formed between the video signal line 20 and the pixel electrode 112. The semiconductor layer 103 is connected to the video signal line 20 through the through hole 140, extending below the video signal line 20, further passing under the scanning line 10, and extending parallel to the scanning line 10. Then, the semiconductor layer 103 passes under the scanning line 10 again and extends to the side of the pixel electrode 112. Then, the semiconductor layer 103 is connected to the contact electrode 107 through the through hole 120. The contact electrode 107 is connected to the pixel electrode 112 through the through hole 130.

The semiconductor layer 103 is doped with impurities, except below the scanning lines 10. The semiconductor layer 103 acts as a conductor. In the portion where the semiconductor layer 103 passes under the scanning line 10, a channel of the TFT is formed. Thus, in FIG. 4, the TFT has a double gate structure in which two channel portions are formed in series. By using the double gate structure, the leakage current in the TFT is reduced to prevent the change in the potential of the pixel electrode.

Figure 5:
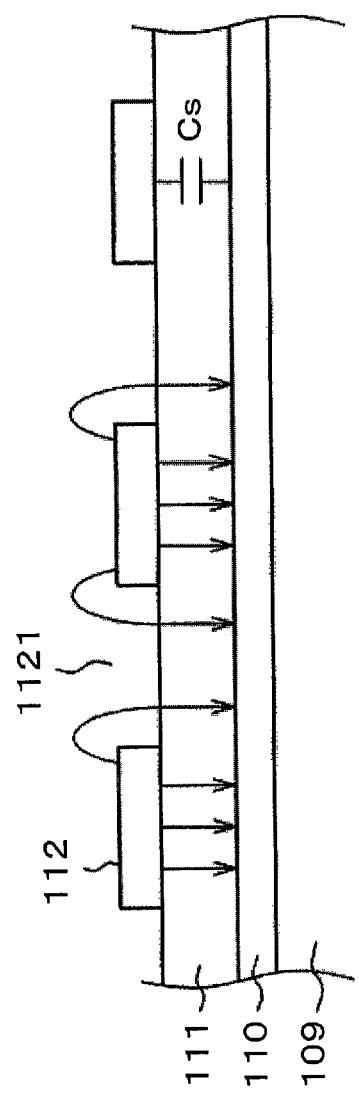
FIG. 5 is a cross-sectional view of a portion of a storage capacitance.

FIG. 5 is a cross-sectional view taken along line A-A of FIG. 1. In FIG. 5, the common electrode 110 formed in a planar shape and the comb-shaped pixel electrode 112 face each other with the capacitance insulating film 111 between them. When a voltage is applied to the pixel electrode 112, lines of electric force are generated as shown in FIG. 5 between the pixel electrode 112 and the common electrode 110 to drive the liquid crystal, and at the same time, electric charges are accumulated in the storage capacitance with the capacitance insulating film 111 between them.

In order to increase the storage capacitance in the limited area of the pixel electrode 112, it is necessary to increase the dielectric constant of the capacitance insulating film. However, the problem is not solved only by increasing the dielectric constant. It is to be noted that, in this specification, the relative dielectric constant is simply referred to as dielectric constant. The first is that the dielectric constant of an insulator has a frequency characteristic. Thus, the dielectric constant at the frequency to be used is a problem. In the present invention, it is necessary to ensure that the flicker does not occur even when the signal write cycle is 10 Hz, so that the dielectric constant at 10 Hz is a problem.

Figure 6:
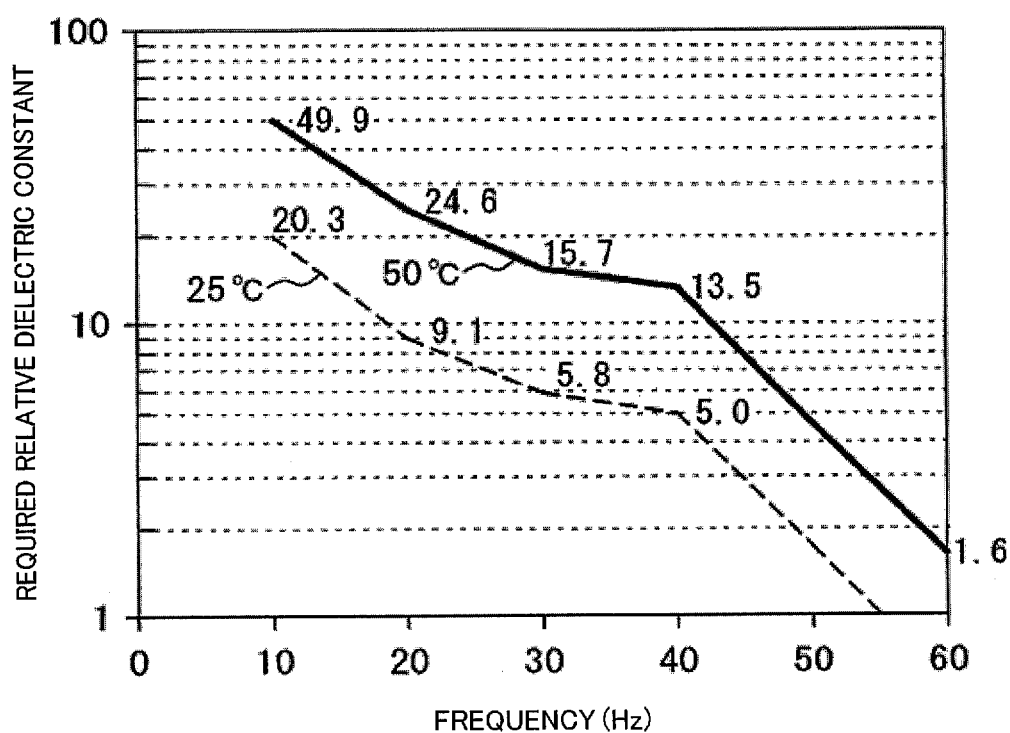
FIG. 6 is a graph that plots a dielectric constant required for the capacitance insulating film in the storage capacitance with respect to the writing frequency to a video signal line.

Further, the liquid crystal display device may also be used in an environment of approximately 50 degrees Celsius, and the dielectric constant at 50 degrees Celsius is required to hold the necessary value so that the liquid crystal display device can operate also at this level of temperature. FIG. 6 is a graph that plots the dielectric constant required for the capacitance insulating film 111 to obtain the storage capacitance that is unlikely to allow the flicker to occur when the film thickness of the capacitance insulating film 111 is 100 nm, for every write frequency both at 25 and 50 degrees Celsius.

As shown in FIG. 6, the required dielectric constant is 49.9 at 50 degrees Celsius. In other words, it is possible to prevent the flicker even in the 10 Hz drive as long as the dielectric constant is 50 or more. On the other hand, at 25 degrees Celsius, the dielectric constant that can prevent the flicker is 20.3 even in the 10 Hz drive. In other words, it is possible to prevent the flicker at 20 degrees Celsius even in the 10 Hz drive as long as the dielectric constant is 21 or more.

Note that in FIG. 6, the dielectric constant required for the capacitance insulating film at 50 degrees Celsius is large, because the leakage current of the TFT is increased particularly at a high temperature. In other words, poly-Si has a large mobility and can increase the signal write speed, which is advantageous in the high-frequency drive, but there is a problem of a large leakage current. Further, a-Si has a small leakage current, whose carrier mobility is one twentieth or less of that of poly-Si, so that a problem occurs in the high frequency writing or when switching to the intermittent drive and to the normal drive.

When the thickness of the capacitance insulating film 111 is 100 nm, a dielectric constant of 50 or more is required for the capacitance dielectric constant. This means that when the thickness of the capacitance insulating film 111 is different, the required dielectric constant is also different. The capacitance is proportional to the dielectric constant of the insulating film and is inversely proportional to the film thickness of the insulating film. Thus, if dielectric constant×film thickness=$\in$d is given as a parameter, the value of $\in$d should be greater than a predetermined value.

When the operating temperature is 50 degrees Celsius, it is given $\in d = 50 \times 100 \times 10^{-9}$ m $= 5 \times 10^{-6}$ m. In other words, at 50 degrees Celsius, it is possible to suppress the flicker as long as $\in$d is $5 \times 10^{-6}$ m or more. Similarly, at 25 degrees Celsius, it is given that $\in d = 21 \times 100 \times 10^{-9}$ m $= 2.1 \times 10^{-6}$ m. In other words, at 50 degrees Celsius, it is possible to suppress the flicker as long as $\in$d is $5 \times 10^{-6}$ m or more.

Figure 7:
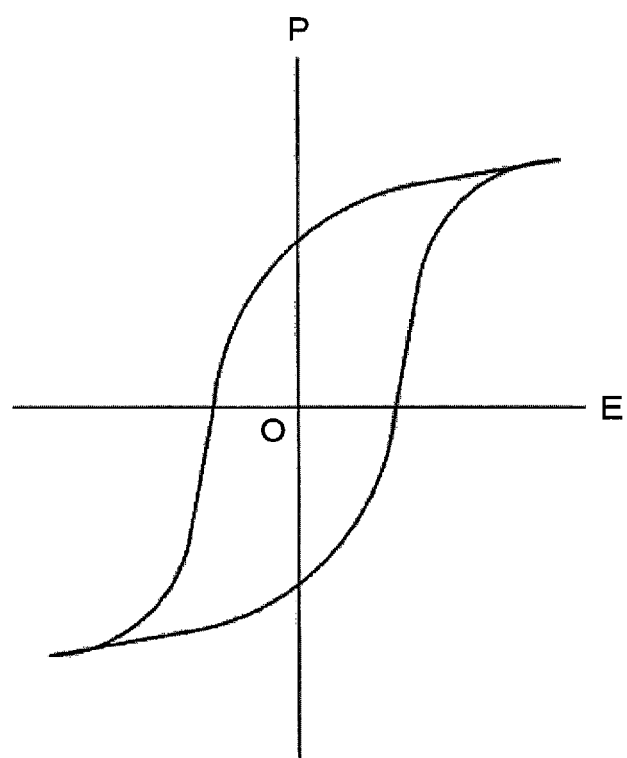
FIG. 7 is an example of the hysteresis of the conductor.

Another important feature of the capacitance insulating film 111 is that the capacitance insulating film 111 has no hysteresis characteristic. Barium titanate ($BaTiO_3$) has a very large dielectric constant simply in terms of the increase in the capacitance of the pixel. However, barium titanate has a hysteresis characteristic as shown in FIG. 7. In FIG. 7, the horizontal axis represents the electric field E that is applied to the insulating film, and the vertical axis represents the polarization P of the insulating film. The liquid crystal display device performs AC driving as shown in FIG. 2. Thus, a possibility arises that the brightness changes for each polarity due to the hysteresis. For this reason, it is necessary that the capacitance insulating film does not have the hysteresis characteristic such as shown in FIG. 7.

Figure 8:
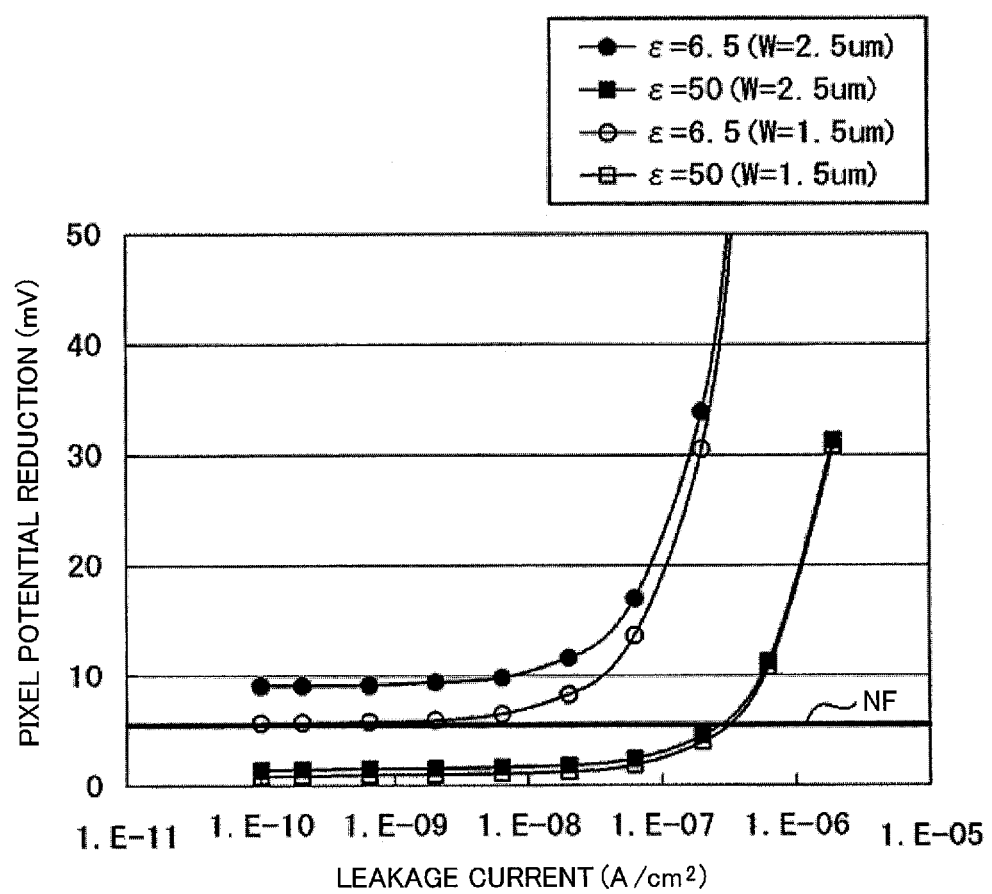
FIG. 8 is a graph showing the relationship between the leakage current and the pixel potential reduction.

FIG. 8 is a graph showing the relationship between the leakage current of the TFT and the reduction in the pixel potential at 440 ppi. In FIG. 8, the vertical axis represents the change in the pixel potential by mv, and the horizontal axis represents the leakage current by $A/cm^2$. In other words, the flicker is visible when the reduction in the pixel potential is large in a predetermined signal writing time period. In FIG. 8, when the reduction in the pixel potential is 5 mV or less as indicated by the line NF, the flicker is not visible.

The reduction in the pixel potential is determined by the capacitance of the pixel and the leakage current. The capacitance of the pixel seems to be dominated by the storage capacitance. Thus, it is determined by the dielectric constant of the capacitance insulating film 111. On the other hand, the leakage current seems to be dominated by the leakage current of the TFT. FIG. 8 is an evaluation of the relationship between the leakage current and the pixel potential reduction, under such assumption.

Figure 9:
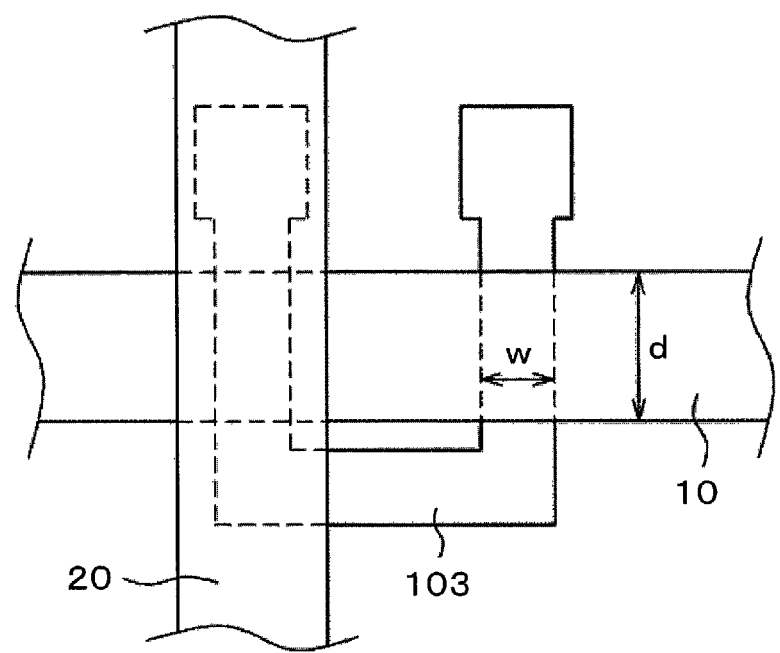
FIG. 9 is a configuration of a TFT taking into account the evaluation of the leakage current of FIG. 8.

The leakage current is obtained from the evaluation of the leakage current in the configuration of the TFT shown in FIG. 4. FIG. 9 is an enlarged plan view of a only portion of the TFT shown in FIG. 4. The operation of the TFT in FIG. 9 is the same as that described in FIG. 4. The TFT in FIG. 9 has a double gate structure in which the channel is formed at two locations. The width of each channel is w, and the length thereof is d. FIG. 8 shows the evaluation when the channel width w is 1.5 μm and 2.5 μm. The greater the channel width the greater the leakage current is. Further, the leakage current is the value when the electric field strength is 2 MV/cm.

In FIG. 8, when the dielectric capacitance of the capacitance insulating film is 6.5, the potential change of the pixel electrode is as large as 5 mV or more. Further, it is also possible to clearly observe the influence on the pixel potential change by the channel width of the TFT. On the other hand, when the dielectric constant of the capacitance insulating film is 50, it is possible to suppress the flicker until the leakage current is $5 \times 10^{-7}$ $A/cm^2$. At this time, the influence of the channel width of the TFT is also small. This is because the storage capacitance is originally large, so that the pixel potential is not reduced even with a small amount of leakage current.

As described above, by setting the dielectric constant of the capacitance insulating film to 50 or more and by using a material with no hysteresis, even if the area of the pixel is small, it is possible to suppress the flicker even when a low-frequency drive of about 10 Hz or intermittent drive is performed. The present embodiment assumes that the pixel density is 440 ppi. However, in a higher definition display, the pixel area is further reduced, in which the leakage is increased and the flicker is more likely to occur. As a result, the higher definition display tends to require a larger dielectric constant. On the other hand, when the drive frequency is set to 20 Hz instead of 10 Hz, the required dielectric constant can be half the dielectric constant at 10 Hz. As a result, both the definition of the product and the desired drive frequency are taken into account, so that the optimal dielectric film is selected.

Note that the capacitance insulating film 111 used for the storage capacitance includes the common electrode 110 of ITO on the lower side, and the pixel electrode 112 of ITO on the upper side. Thus, when the refractive index of the capacitance insulating film 111 is greatly different from the ITO, the reflection at the interface between the capacitance insulating film 111 and the ITO increases, and the screen brightness is reduced. The refractive index is dependent on the wavelength. In general, the evaluation is performed using the refractive index of the light of a wavelength of 632.8 nm. In other words, the refractive index of the capacitance insulating film 111 used for the storage capacitance with respect to a light of a wavelength of 632.8 nm should be set to a range from 1.7 to 2.0, which is close to the refractive index of the ITO.

Second Embodiment

As described in the first embodiment, by setting the dielectric constant of the capacitance insulating film 111 of the storage capacitance to 50 or more, it is possible to suppress the flicker also in an environment of 50 degrees Celsius in a pixel area of 500 ppi or less. However, when the liquid crystal display device is not required to operate in a temperature environment as high as 50 degrees Celsius, or in other cases, the leakage current or the like of the TFT is small, and there is no need to increase the storage capacitance to a very high level. As a result, the dielectric constant of the capacitance insulating film used for the storage capacitance can also be reduced.

As described with reference to FIG. 6, when the film thickness of the capacitance insulating film 111 is 100 nm, it is possible to increase the storage capacitance to a level that can prevent the flicker from occurring at 25 degrees Celsius, as long as the dielectric of the capacitance insulating film 111 is 21 or more. Hafnium oxide ($HfO_2$) whose dielectric constant is 25 at 25 degrees Celsius can meet this condition. In the case of hafnium oxide, the dielectric constant is 25, which is greater than 21, so that a visible flicker does not occur even if the use temperature slightly exceeds 25 degrees Celsius. Further, by suppressing the leakage current by changing the configuration of the TFT or by other modifications, it is possible to suppress the flicker also in a normal environment that is higher than 25 degrees Celsius.

Figure 10:
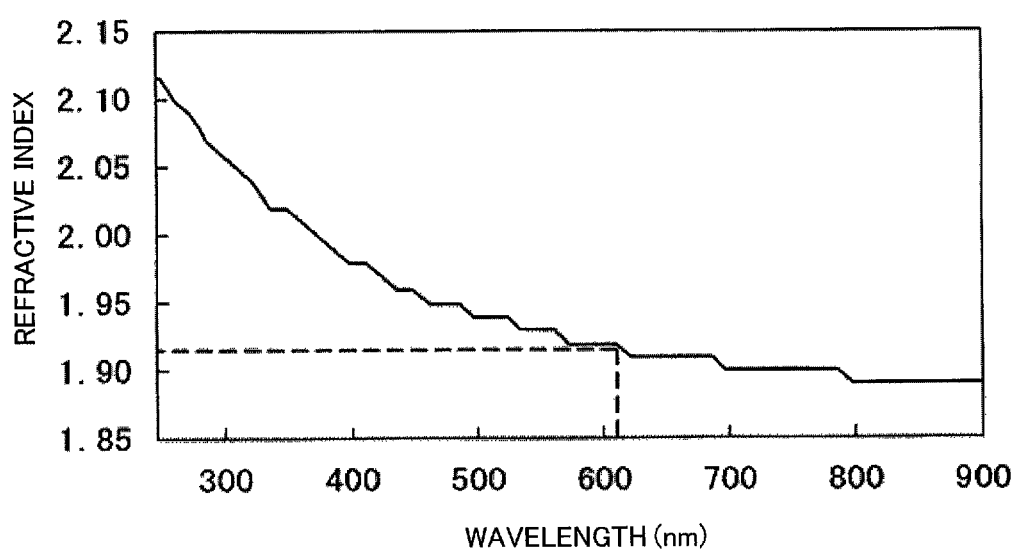
FIG. 10 shows the characteristics of the refractive index to the wavelength of hafnium oxide.

FIG. 10 shows the wavelength dependence of the refractive index of hafnium oxide. As shown in FIG. 10, the refractive index of hafnium oxide with respect to a light of a wavelength of 632.8 nm is 1.9, which is close to the refractive index of the ITO and meets the range of the refractive index from 1.7 to 2.0.

Third Embodiment

Figure 11:
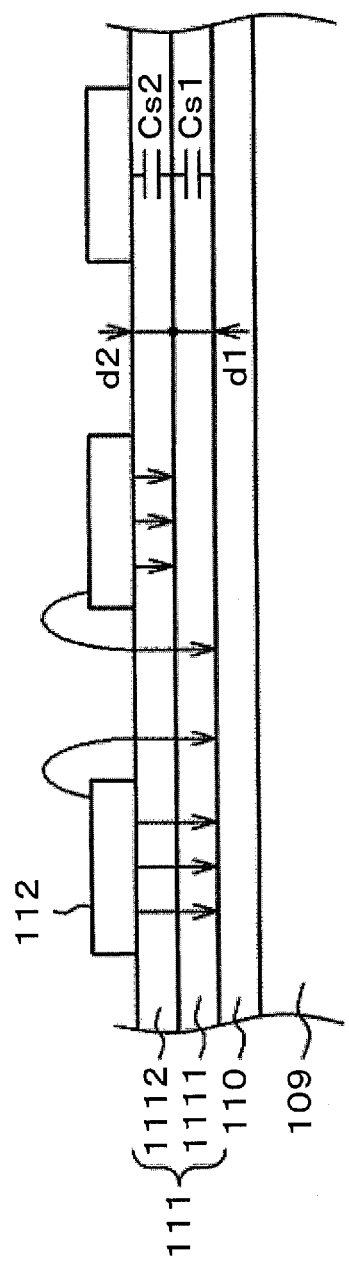
FIG. 11 is a cross-sectional view of a portion of the storage capacitance when the capacitance insulating film has a two-layer structure.

There is a possibility that the leakage current may increase in the insulating film whose dielectric constant configuring the storage capacitance is 50 or more. When the leakage current is large, the reduction in the pixel potential occurs even if the capacitance has been increased, and as a result, the flicker will occur. In the present embodiment, as shown in FIG. 11, the capacitance insulating film 111 has a two-layer structure in which SiN film 1111 is formed on the lower layer. SiN has a high resistivity and can suppress the leakage current.

Meanwhile, in this case, the capacitance is a series connection. Thus, if the SiN film 1111 is made thick, the storage capacitance is determined by the SiN film 1111 even if a high dielectric constant insulating film 1112 is used. As a result, it makes no sense to use the high dielectric constant insulating film 1112. Thus, in this case, the film thickness of the SiN film is preferably 70 nm or less.

In order to increase the storage capacitance, the capacitance insulating film 111 may be formed by using a single film of the SiN film to reduce the film thickness of the SiN film. However, if the film thickness of the SiN insulating film is reduced to an extremely low level, a pinhole occurs and the common electrode may not be isolated from the pixel electrode. For this reason, it is difficult to suppress the flicker in a low frequency drive of about 10 Hz by using the SiN film alone.

Meanwhile, as in the case of the present embodiment, the laminate configuration of the high dielectric constant insulating film and the SiN film allows to form a storage capacitance with a high capacitance, a small leakage current, and good isolating properties, in such a way that the common electrode and the pixel electrode are kept isolated by using the high dielectric constant insulating film or using the high dielectric insulating film and the SiN film, and that the SiN film is allowed to reduce the leakage current.

As for the film thickness in FIG. 11, it is preferable that the thickness d1 of the SiN film 1111 on the lower layer and the thickness d2 of the high dielectric constant insulating film 1112 on the upper layer are approximately the same, or the thickness d2 of the upper high dielectric constant insulating film 1112 is made greater than the thickness d1 of the lower SiN film 1111. When the storage capacitance is divided into a capacitance CS2 on the side of the dielectric constant insulating film and a capacitance CS1 on the SiN side, the capacitance of the whole storage capacitance is dominated by the capacitance CS1 on the SiN side which is smaller than the dielectric constant. For this reason, increasing the film thickness on the SiN side of the lower layer is not a good idea.

Note that in the above description, the SiN film 1111 is placed on the lower layer and the high dielectric constant insulating film 1112 is placed on the upper layer. However, the capacitance insulating film 111 can also be configured such that the high dielectric constant insulating film 1112 is placed on the lower layer and the SiN film 1111 is placed on the upper layer. In this case also, it is preferable that the film thickness of the high dielectric constant insulating film 1112 is equal to the film thickness of the SiN film 1111, or that the film thickness of the high dielectric insulating film 1112 is greater than the film thickness of the SiN film 1111.

By also configuring the condition of the high dielectric constant insulating film in this embodiment as described in the first or second embodiment, it is possible to suppress the occurrence of the flicker compared to the case of using the SiN film alone. Note that by setting the refractive index of the high dielectric constant insulating film to the range from 1.7 to 2.0, it is possible to eliminate nearly all reflections on the interface with the SiN film.

The foregoing embodiments have focused on the configuration in which the common electrode is formed in a planar shape on the organic passivation film, on which the pixel electrode with a slit or a comb-like shape is formed through the capacitance insulating film. However, the present invention can also be applied in the same manner to the configuration in which the pixel electrode is formed in a planar shape on the organic passivation film, on which the common electrode with a slit or a comb-like shape is formed through the capacitance insulating film. Further, the present invention is based on the assumption of using the comb-like electrode shape in the IPS mode. However, the present invention can also be applied to the case in which a transparent capacitance is formed over the entire pixel surface by using a planar ITO electrode, a capacitance film, and a planar pixel electrode in the TN and VA modes.

As described above, by applying the present invention, it is possible to realize a liquid crystal display device capable of preventing the flicker even in a low frequency of 10 Hz or intermittent drive. This is, of course, means that it is possible to prevent the flicker, or the like, even in the drive range from 10 Hz or more to the normal frequency of 60 Hz.

What is claimed is:

1. A liquid crystal display device comprising:
a TFT substrate including pixels formed between scanning lines extending in a first direction and arranged in a second direction, and video signal lines extending in the second direction and arranged in the first direction;
a counter substrate; and
a liquid crystal interposed between the TFT substrate and the counter substrate,
wherein the pixels are formed at a density of 400 pixels per inch (ppi) or more in the first direction,
wherein the pixel has a TFT formed of poly-Si as a switching element,
wherein in the pixel, a capacitance insulating film is formed on a first electrode formed in a planar shape on which a comb-shaped second electrode formed,
wherein when the film thickness of the capacitance insulating film is d and the dielectric constant at a frequency of 10 Hz is $\in$ in an operating environment of 50 degrees Celsius, it is given that $\in d \geq 5 \times 10^{-6}$ m at 10 Hz frequency,
wherein the capacitance insulating film does not have a hysteresis characteristic,
wherein the refractive index of the capacitance insulating film with respect to a light of a wavelength of 632.8 nm is in the range from 1.7 to 2.0.

2. A liquid crystal display device according to claim 1, wherein the first electrode is a common electrode and the second electrode is a pixel electrode.

3. A liquid crystal display device according to claim 1, wherein the cycle in which a video signal is written in the first electrode or in the second electrode is 10 Hz or less.

4. A liquid crystal display device according to claim 1, wherein when the period of rewriting the video signal to the pixel is one frame, the frame is configured with a scanning period and a break period, wherein the cycle of the frame is 10 Hz or less.

5. A liquid crystal display device comprising:
a TFT substrate including pixels formed between scanning lines extending in a first direction and arranged in a second direction, and video signal lines extending in the second direction and arranged in the first direction;
a counter substrate; and
a liquid crystal interposed between the TFT substrate and the counter substrate,
wherein the pixels are formed at a density of 400 pixels per inch (ppi) or more in the first direction,
wherein the pixel has a TFT formed of poly-Si as a switching element,
wherein in the pixel, a capacitance insulating film is formed on a first electrode formed in a planner shape on which a comb-shaped second electrode is formed,
wherein when the film thickness of the capacitance insulating film is d and the dielectric constant at a frequency of 10 Hz is $\in$ in an operating environment of 25 degrees Celsius, it is given that $\in d \geq 2.1 \times 10^{-6}$ m at 10 Hz frequency,
wherein the capacitance insulating film does not have a hysteresis characteristic,
wherein the refractive index of the capacitance insulating film with respect to a light of a wavelength of 632.8 nm is in the range from 1.7 to 2.0.

6. A liquid crystal display device according to claim 5, wherein the first electrode is a common electrode and the second electrode is a pixel electrode.

7. A liquid crystal display device according to claim 5, wherein the cycle in which a video signal is written in the first electrode or in the second electrode is 10 Hz or less.

8. A liquid crystal display device according to claim 5, wherein when the period of rewriting the video signal to the pixel is one frame, the frame is configured with a scanning period and a break period, wherein the cycle of the frame is 10 Hz or less.

9. A liquid crystal display device according to claim 5, wherein the capacitance insulating film is formed of hafnium oxide ($HfO_2$).

10. A liquid crystal display device comprising:
a TFT substrate including pixels formed between scanning lines extending in a first direction and arranged in a second direction, and video signal lines extending in the second direction and arranged in the first direction;
a counter substrate; and
a liquid crystal interposed between the TFT substrate and the counter substrate,
wherein the pixels are formed at a density of 400 pixels per inch (ppi) or more in the first direction,
wherein the pixel has a TFT formed of poly-Si as a switching element,
wherein in the pixel, a capacitance insulating film is formed on a first electrode formed in a planar shape on which a comb-shaped second electrode is formed,
wherein the capacitance insulating film is formed by a first layer and a second layer,
wherein the first layer is formed of SiN and the second layer is formed by a high dielectric constant insulating film,
wherein when the film thickness of the high dielectric constant insulating film is d and the dielectric constant at a frequency of 10 Hz is $\in$ in an operating environment of 50 degrees Celsius, it is given that $\in d \geq 2.1 \times 10^{-6}$ m at 10 Hz frequency,
wherein the capacitance insulating film does not have a hysteresis characteristic,
wherein the refractive index of the capacitance insulating film with respect to a light of a wavelength of 632.8 nm is in the range from 1.7 to 2.0.

11. A liquid crystal display device according to claim 10, wherein the thickness of the first layer is equal to or less than the thickness of the second layer.

12. A liquid crystal display device according to claim 10, wherein the first layer is formed on the lower side of the second layer.

* * * * *